US011450023B2

United States Patent
Woo et al.

(10) Patent No.: US 11,450,023 B2
(45) Date of Patent: Sep. 20, 2022

(54) METHOD AND APPARATUS FOR DETECTING ANCHOR-FREE OBJECT BASED ON DEEP LEARNING

(71) Applicants: HYUNDAI MOTOR COMPANY, Seoul (KR); KIA MOTORS CORPORATION, Seoul (KR); KOREA ADVANCED INSTITUTE OF SCIENCE AND TECHNOLOGY, Daejeon (KR)

(72) Inventors: Ha Yong Woo, Gwangmyeong-si (KR); Jun Mo Kim, Daejeon (KR); Beom Young Kim, Daejeon (KR); Si Haeng Lee, Daejeon (KR); Jang Hyeon Lee, Daejeon (KR); Do Yeon Kim, Daejeon (KR)

(73) Assignees: HYUNDAI MOTOR COMPANY, Seoul (KR); KIA MOTORS CORPORATION, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/132,054

(22) Filed: Dec. 23, 2020

(65) Prior Publication Data

US 2022/0020167 A1 Jan. 20, 2022

(30) Foreign Application Priority Data

Jul. 16, 2020 (KR) ........................ 10-2020-0088351

(51) Int. Cl.
*G06K 9/00* (2022.01)
*G06T 7/73* (2017.01)
*G06T 11/20* (2006.01)
*G06V 10/25* (2022.01)

(52) U.S. Cl.
CPC .............. *G06T 7/73* (2017.01); *G06T 11/206* (2013.01); *G06V 10/25* (2022.01); *G06T 2207/20072* (2013.01); *G06T 2207/20081* (2013.01); *G06T 2207/20084* (2013.01); *G06T 2210/12* (2013.01)

(58) Field of Classification Search
CPC ...................... G06T 7/73; G06T 11/206; G06T 2207/20072; G06T 2207/20081; G06T 2207/20084; G06T 2210/12; G06V 10/25
USPC ......................................... 382/103
See application file for complete search history.

(56) References Cited

U.S. PATENT DOCUMENTS 9,886,771 B1 * 2/2018 Chen ..................... G06T 11/206
2019/0172223 A1 * 6/2019 Vajda ................... G06V 40/103

OTHER PUBLICATIONS

Xizhou Zhu et al., "Deformable ConvNets v2: More Deformable, Better Results", Proceedings of the IEEE Conference on Computer Vision and Pattern Recognition, 2019, pp. 9308-9316.

(Continued)

*Primary Examiner* — Stephen P Coleman
(74) *Attorney, Agent, or Firm* — Morgan, Lewis & Bockius LLP

(57) ABSTRACT

A method for detecting an anchor-free object based on deep learning may include receiving a target image for object detection, inputting the image to a backbond network and performing learning to generate a heatmap, post-processing the heatmap, and outputting the post-processed result on a screen.

17 Claims, 13 Drawing Sheets

(56) References Cited

OTHER PUBLICATIONS

Joseph Redmon et al., "You Only Look Once: Unified, Real-Time Object Detection", Proceedings of the IEEE Conference on Computer Vision and Pattern Recognition, 2016, pp. 779-788.
Hei Law et al., "CornerNet: Detecting Objects as Paired Keypoints", Proceedings of the European Conference on Computer Vision (ECCV), 2018, pp. 1-17.
Xingyi Zhou et al., "Objects as Points", arXiv:1904.07850, 2019, pp. 1-12.
Fisher Yu et al., "Deep Layer Aggregation", Proceedings of the IEEE Conference on Computer Vision and Pattern Recognition, 2018, pp. 2403-2412.

* cited by examiner

METHOD AND APPARATUS FOR DETECTING ANCHOR-FREE OBJECT BASED ON DEEP LEARNING

CROSS-REFERENCE TO RELATED APPLICATION

This application claims the benefit of priority to Korean Patent Application No. 10-2020-0088351, filed in the Korean Intellectual Property Office on Jul. 16, 2020, the entire contents of which are incorporated herein by reference.

TECHNICAL FIELD

The present disclosure relates to object detection, and more particularly, relates to technologies of detecting an anchor-free object based on deep learning using a two-dimensional (2D) Gaussian kernel.

BACKGROUND

Object recognition is a technology of finding and classifying locations of a plurality of objects in one image.

Current object recognition is the basic, important technology used in many fields such as autonomous driving, robotics, text recognition, face recognition, and activity recognition and used in various computer vision technologies—for example, image segmentation, object tracking, image captioning, and the like —.

Recently, with the development of deep learning technology, such an object recognition technology has been developed.

A conventional representative object recognition method includes a scheme for recognizing an anchor-based object to extract many boxes of a place where objects may be found in the image and detect an object in such a manner as to clear a box for the overlapped object, as shown in FIG. 1, and an anchor-free scheme for representing key-points of a box including each object as a heatmap and converting the key-points into coordinate values, as shown in FIG. 2.

However, because the scheme for recognizing the anchor-based object has a structure of generating many box candidate regions and clearing a portion where there is no object, it is difficult to perform intuitive understanding for a detection scheme and it makes it hard to perform a tuning work of a parameter necessary to be applied to a specific application.

Furthermore, because a size or rate of an anchor box which should be defined according to characteristics of a dataset has a great influence on object recognition performance, the scheme for recognizing the anchor-based object should be carefully selected.

The visualization of a heatmap of the scheme for recognizing the anchor-based object facilitates the interpretation of an operation of a recognizer. However, to perform object detection, there is a need for heatmaps for a top-left corner and a bottom-right corner as many as the number of categories, embedding heatmaps, and offset heatmaps for extracting accurate locations.

As such, the scheme for recognizing the anchor-based object needs more accurate grouping about whether each corner represents any object as well as needing to consider a weight between loss functions of each element due to a structure needing heatmaps of several channels. Thus, because complexity becomes high and because the amount of calculation additionally required is increased, it is difficult to detect an object in real time.

SUMMARY

The present disclosure has been made to solve the above-mentioned problems occurring in the prior art while advantages achieved by the prior art are maintained intact.

An aspect of the present disclosure provides a method and apparatus for detecting an anchor-free object based on deep learning using a 2D Gaussian kernel.

Another aspect of the present disclosure provides a method and apparatus for detecting an anchor-free object based on deep learning, which is capable of quickly and accurately recognizing and interpreting an object on a network of a simple structure.

Another aspect of the present disclosure provides a method and apparatus for detecting an anchor-free object based on deep learning, which facilitates parameter tuning by facilitating visualization and intuitive understanding of an operation by using a Gaussian kernel.

Another aspect of the present disclosure provides a method and apparatus for detecting an anchor-free object based on deep learning using 2D Gaussian kernel, which is capable of finding a center point of an object through the 2D Gaussian kernel and quickly and accurately performing object recognition using only a heatmap of one channel and only one loss function.

Another aspect of the present disclosure provides an autonomous vehicle equipped with an apparatus for detecting an anchor-free object based on deep learning using a 2D Gaussian kernel.

The technical problems to be solved by the inventive concept are not limited to the aforementioned problems, and any other technical problems not mentioned herein will be clearly understood from the following description by those skilled in the art to which the present disclosure pertains.

According to an aspect of the present disclosure, a method for detecting an anchor-free object based on deep learning may include receiving a target image for object detection by an input device, inputting the image to a backbond network and performing learning to generate a heatmap by a learning device, post-processing the heatmap by a post-processing device, and outputting the post-processed result on a screen by an output device.

As an embodiment, the generated heatmap may be configured with channels as many as the number of objects to be classified, the objects being included in the image.

As an embodiment, the heatmap on which the object is displayed may be generated using a two-dimensional (2D) Gaussian kernel for each channel through the learning.

As an embodiment, the post-processing of the heatmap may include determining center coordinates of the object based on a local maximum value of the 2D Gaussian kernel, calculating an end point for each direction of the object based on the determined center coordinates, and generating a boundary box based on the calculated end point for each direction.

As an embodiment, the local maximum value may be determined through 5×5 max pooling computation.

As an embodiment, the calculating of the end point for each direction of the object based on the determined center coordinates may include setting the determined center coordinates to a search start point, comparing a local value on coordinates moving a certain level in an upward direction, a downward direction, a leftward direction, or a rightward direction from the start point with a threshold, and determining coordinates, corresponding to the local value less than the threshold, for each direction as an end point of the direction.

As an embodiment, the backbone network may be a deformable convolutional neural network having a variable filter size and shape depending on the image.

As an embodiment, a loss function L used for the learning may be a mean squared error, and a size weight mask (SWM) technique of multiplying a weight corresponding to an object size by a loss value to output the loss value irrespective of the object size may be applied to the loss function L.

As an embodiment, the loss function L may be that $$L = \sum_p M(p) \times (Y(p) - \hat{Y}(p))^2,$$

where, p denotes each pixel of the heatmap, Y denotes the ground truth heatmap, $\hat{Y}$ denotes the backbone network output heatmap, and M denotes the SWM. The SWM pixel value M(p) in the loss function L may be determined as a value obtained by dividing a size of the entire heatmap by the size of the object for a region where there is the object and may be determined as "1" for a region where there is no object.

As an embodiment, the inputting of the image to the backbond network and the performing of the learning to generate the heatmap may include generating a ground truth heatmap including a 2D Gaussian kernel having the same size as a region of each object based on box coordinates included in a ground truth label and performing learning to reduce a Euclidean distance between the ground truth heatmap and an output heatmap of the backbone network.

According to another aspect of the present disclosure, an apparatus for detecting an anchor-free object based on deep learning may include an input device that receives a target image for object detection, a learning device that inputs the image to a backbond network and performs learning to generate a heatmap, a post-processing device that post-processes the heatmap, and an output device that outputs the post-processed result on a screen.

As an embodiment, the generated heatmap may be configured with channels as many as the number of objects to be classified, the objects being included in the image.

As an embodiment, the learning device may generate the heatmap on which the object is displayed using a 2D Gaussian kernel for each channel through the learning.

As an embodiment, the preprocessing device may determine center coordinates of the object based on a local maximum value of the 2D Gaussian kernel, may calculate an end point for each direction of the object based on the determined center coordinates, and may generate a boundary box based on the calculated end point for each direction.

As an embodiment, the local maximum value may be determined through 5×5 max pooling computation.

As an embodiment, the post-processing device may set the determined center coordinates to a search start point, may compare a local value on coordinates moving a certain level in an upward direction, a downward direction, a leftward direction, or a rightward direction from the start point with a threshold, and may identify coordinates, corresponding to the local value less than the threshold, for each direction to determine the coordinates as an end point of the direction.

As an embodiment, the backbone network may be a deformable convolutional neural network having a variable filter size and shape depending on the image.

As an embodiment, a loss function L used for the learning may be a mean squared error, and a size weight mask (SWM) technique of multiplying a weight corresponding to an object size by a loss value to output the loss value irrespective of the object size may be applied to the loss function L.

As an embodiment, the loss function L may be that $$L = \sum_p M(p) \times (Y(p) - \hat{Y}(p))^2,$$

where, p denotes each pixel of the heatmap, Y denotes the ground truth heatmap, $\hat{Y}$ denotes the backbone network output heatmap, and M denotes the SWM. The SWM pixel value M(p) in the loss function L may be determined as a value obtained by dividing a size of the entire heatmap by the size of the object for a region where there is the object and may be determined as "1" for a region where there is no object.

As an embodiment, the learning device may generate a ground truth heatmap including a 2D Gaussian kernel having the same size as a region of each object based on box coordinates included in a ground truth label and may perform learning to reduce a Euclidean distance between the ground truth heatmap and an output heatmap of the backbone network.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
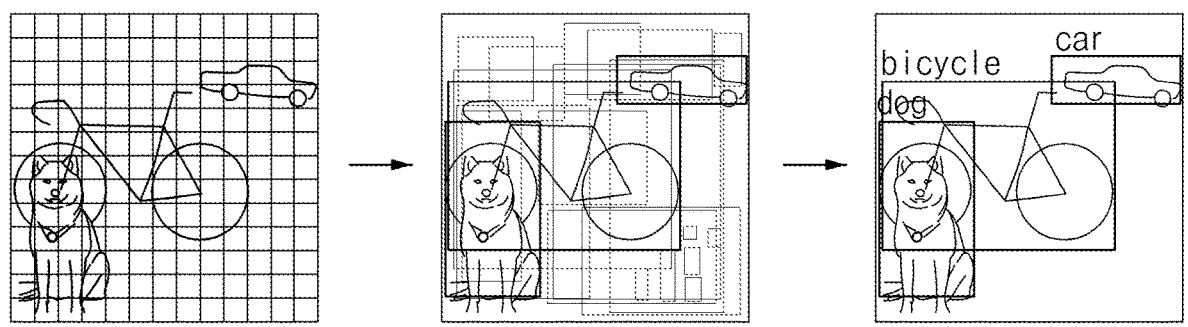
FIG. 1 is a drawing illustrating a method for recognizing an anchor-based object according to the related art.
Figure 2:
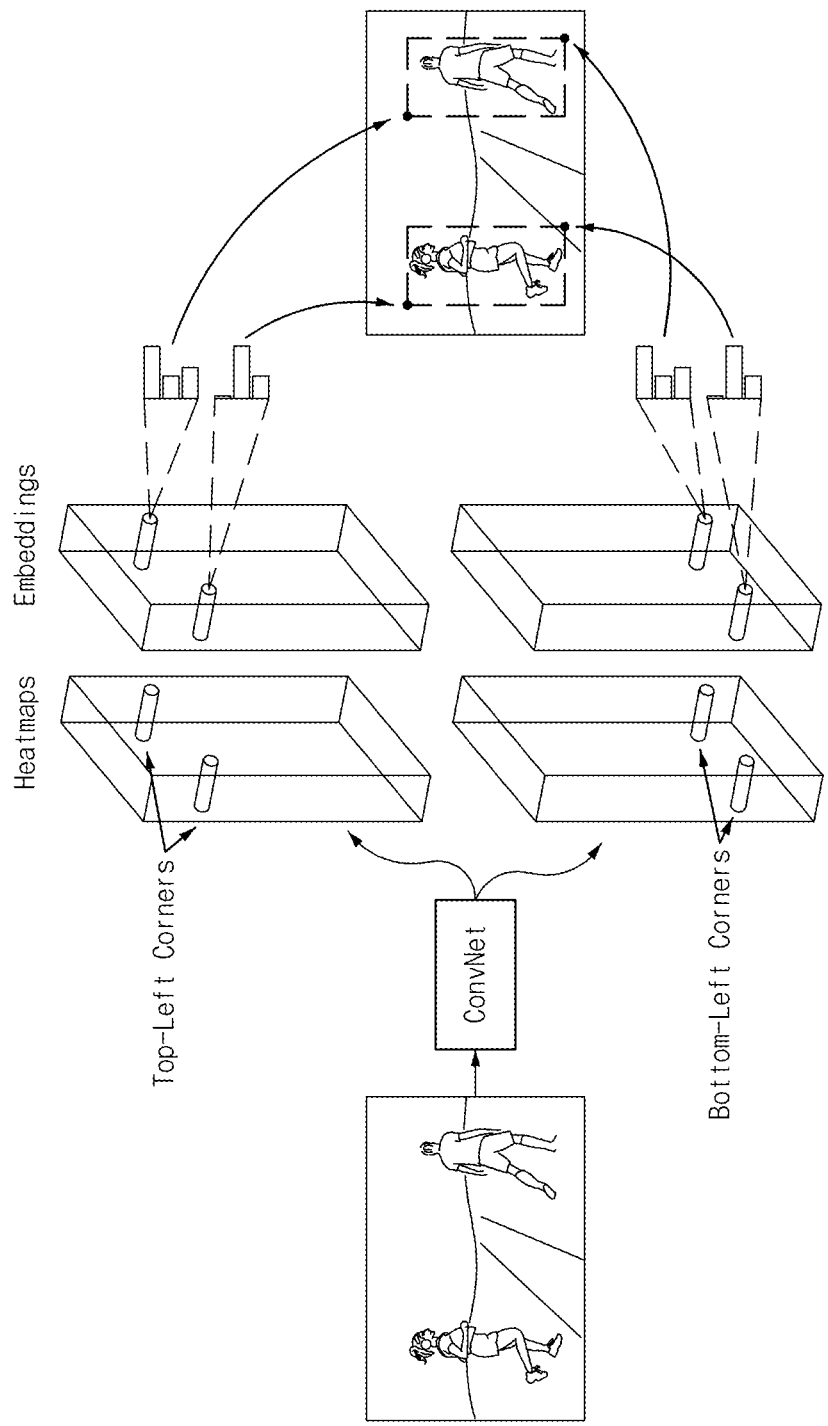
FIG. 2 is a drawing illustrating a method for recognizing an anchor-free object according to the related art.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 3 to 13.

Figure 3:
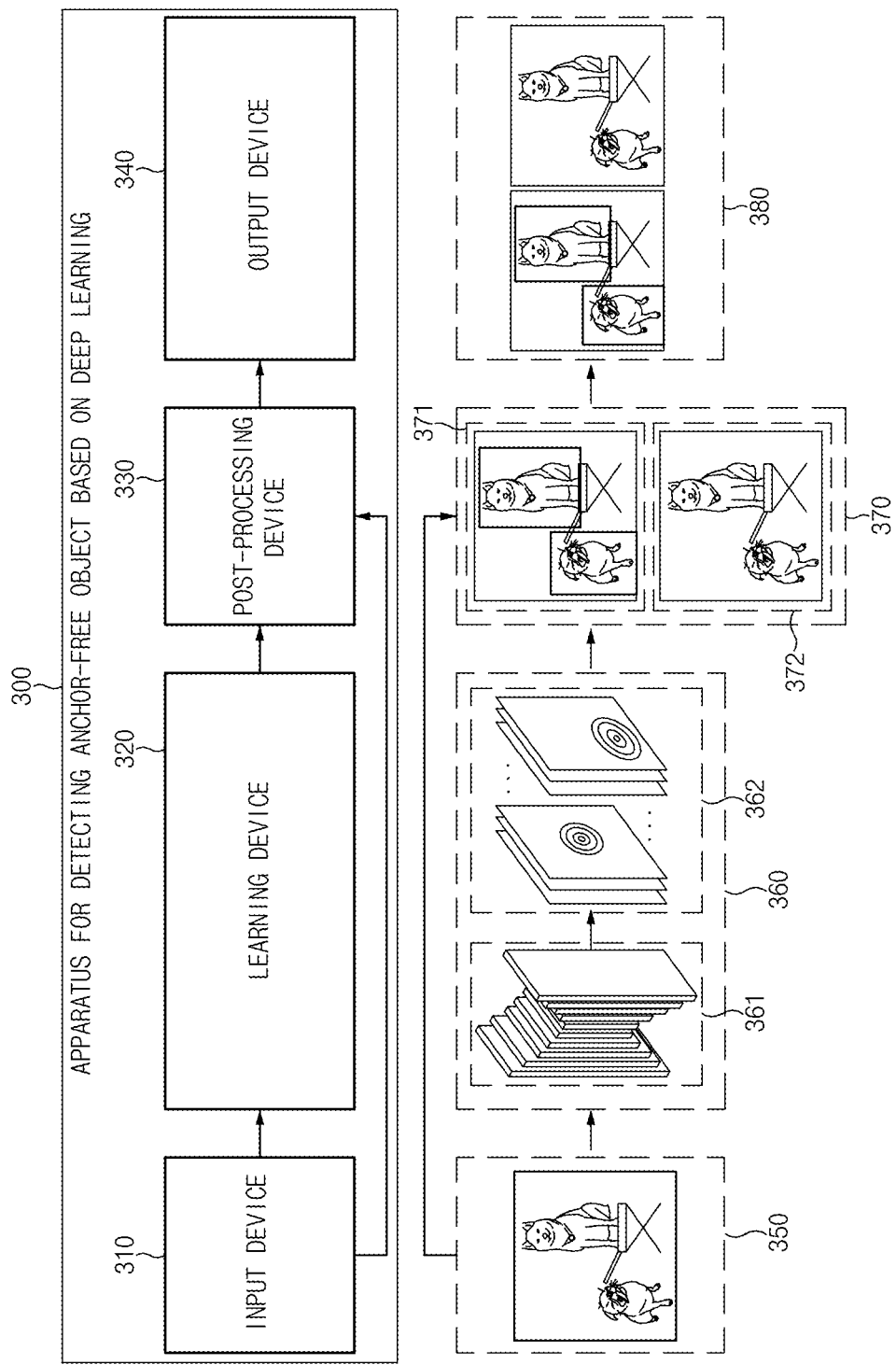
FIG. 3 is a drawing illustrating a structure of an apparatus for detecting an anchor-free object based on deep learning according to an embodiment of the present disclosure.

FIG. 3 is a drawing illustrating a structure of an apparatus for detecting an anchor-free object based on deep learning according to an embodiment of the present disclosure.

Hereinafter, for convenience of description, an apparatus 300 for detecting an anchor-free object based on deep learning will be described as being simply called the apparatus 300 for detecting the object.

Referring to FIG. 3, the apparatus 300 for detecting the object may be configured to include an input device 310, a learning device 320, a post-processing device 330, and an output device 340.

The input device 310 may receive a target image for object detection. As an example, the target image for object detection may be an image captured by a camera provided in an autonomous vehicle.

The learning device 320 may input the image received from the input device 310 to the backbone network 361 and may generate a heatmap 362 for each channel through machine learning.

The learning device 320 may establish channels as many as the number of objects to be classified, which are included in the image, and may generate a heatmap for each channel.

As an example, as shown in reference numeral 350, when the category to be classified is an animal and when the animals included in the input image are one puppy and one cat, the learning device 320 may establish two channels and may generate a heatmap for each channel.

As shown in reference numeral 362, the learning device 320 may generate a heatmap, which is represented as a 2D Gaussian kernel, for each channel through machine learning.

The 2D Gaussian kernel may be filled with local values between "0" and "1". The closer the local value is to "1" on the heatmap, the 2D Gaussian kernel may be represented in red. The closer the local value is to "0", the 2D Gaussian kernel may be represented in blue.

In other words, the closer the heatmap based on the 2D Gaussian kernel is to the center of the object, the heatmap may be displayed in red. The distant the heatmap is from the center of the object, the heatmap may be displayed in blue.

The heatmap for each channel, which is output by the learning device 320, may have a size which is more reduced than resolution of the input image by ratio R. Herein, an R value may vary with the design of those skilled in the art.

A deformable convolutional neural network having a variable filter size and shape depending on the input image may be applied to the backbone network 361 provided in the learning device 320.

Furthermore, the loss function used for the machine learning may be a mean squared error (MSE), and a size weight mask (SWM) technique of multiplying a weight corresponding to an object size by a loss value to output the loss value irrespective of the object size may be applied to the loss function.

As an example, the loss function L may be defined as Equation 1 blow.

$$L = \sum_{p} M(p) \times (Y(p) - \hat{Y}(p))^2, \qquad \text{[Equation 1]}$$

Herein, p denotes each pixel of the heatmap, Y denotes the ground truth heatmap, Ŷ denotes the backbone network output heatmap, and M denotes the SWM.

The SWM pixel value M(p) in Equation 1 above may be determined as a value obtained by dividing a size (an area) of the entire heatmap by a size (an area) of an object for a region where there is the object and may be determined as "1" for a region where there is no object.

The learning device 320 may generate a ground truth heatmap including a 2D Gaussian kernel having the same size as a region of each object based on box coordinates—that is, a boundary box—included in a ground truth label.

The learning device 320 may perform learning to reduce a Euclidean distance between the ground truth heatmap and an output heatmap of the backbone network for a corresponding input image. The object detection reliability of the learning device 320 may be identified through the learning, and a hyperparameter may be tuned according to the learned result such that the object detection reliability of an object detector 300 may be improved.

As shown in reference numeral 370, the post-processing device 330 may post-process the heatmap 362 for each channel to extract an end point for each direction—that is, height and width values—of a corresponding object and may determine a boundary box corresponding to the object based on the extracted end point for each direction. The post-processing device 330 may add the determined boundary box to an image to generate a boundary box image 371.

Furthermore, the post-processing device 330 may merge the heatmap 362 for each channel into one heatmap and may map the one heatmap to the image to generate a heatmap image 372.

As shown in reference numeral 380, the output device 340 may output a boundary box image and a heatmap image on a screen.

Figure 4:
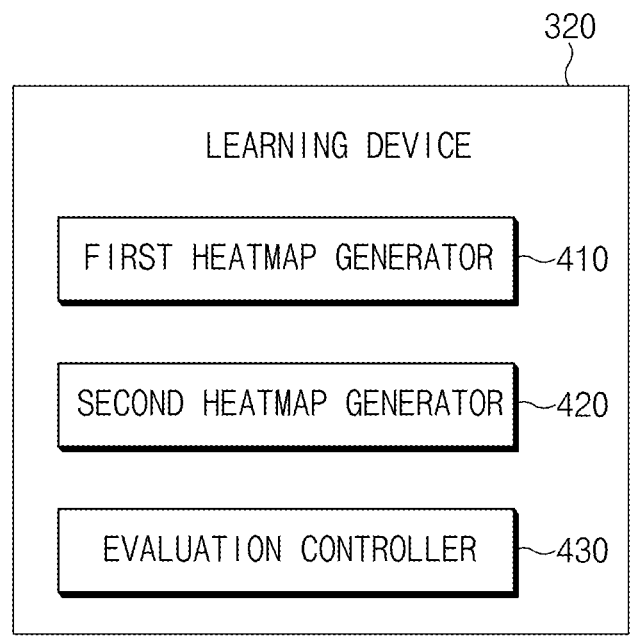
FIG. 4 is a block diagram illustrating a structure of the learning device of FIG. 3.

FIG. 4 is a block diagram illustrating a structure of the learning device of FIG. 3.

A learning device 320 according to an embodiment may be configured to include a first heatmap generator 410, a second heatmap generator 420, and an evaluation controller 430.

The first heatmap generator 410 may generate a ground truth heatmap based on a labeled image included in a ground truth dataset.

The second heatmap generator 420 may generate an output heatmap through machine learning for an image to be analyzed.

The evaluation controller 430 may calculate a Euclidean distance between the ground truth heatmap and the output heatmap and may evaluate reliability of an object detector 300 of FIG. 3.

The evaluation controller 430 may tune a hyperparameter based on the result of evaluating the reliability and may control to minimize the Euclidean distance between the ground truth heatmap and the output heatmap.

Figure 5:
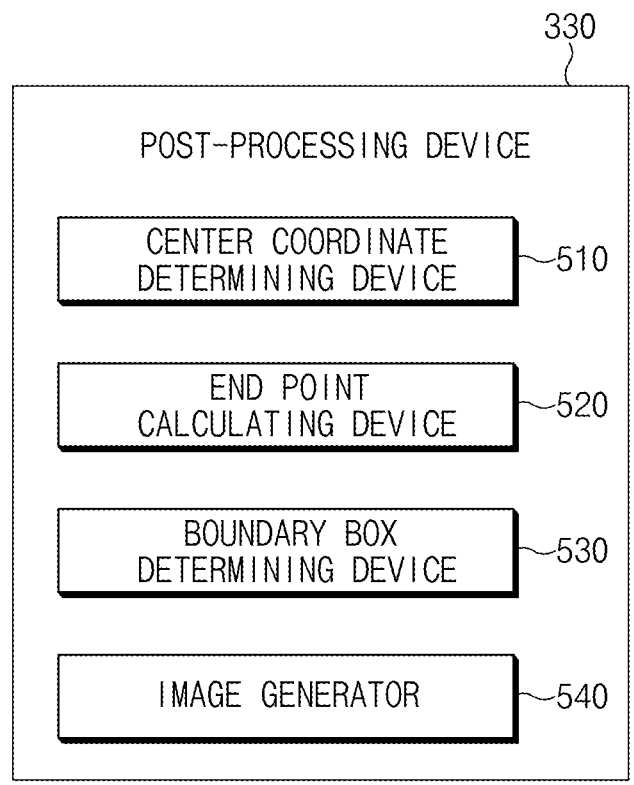
FIG. 5 is a block diagram illustrating a structure of the post-processing device of FIG. 3.

FIG. 5 is a block diagram illustrating a structure of the post-processing device of FIG. 3.

Referring to FIG. 5, a post-processing device 330 may be configured to include a center coordinate determining device 510, an end point calculating device 520, a boundary box determining device 530, and an image generator 540.

The center coordinate determining device 510 may determine center coordinates of an object based on a heatmap for each channel.

As an example, the center coordinate determining device 510 may determine the red center of the heatmap as center coordinates of the object.

The end point calculating device 520 may calculate an end point for each direction in the object.

As an example, the end point calculating device 520 may determine an end point of the object for each direction while moving for each certain level in an upward, downward, leftward, or rightward direction around center coordinates—that is, a red point—.

When end points for all directions are determined, the boundary box determining device 530 may determine a boundary box based on the determined end point for each direction.

The image generator 540 may map the determined boundary box to the input image to generate a boundary box image.

Furthermore, the image generator 540 may merge a heat map for each channel and may map the merged heatmap to the input image to generate a heatmap image.

Figure 6:
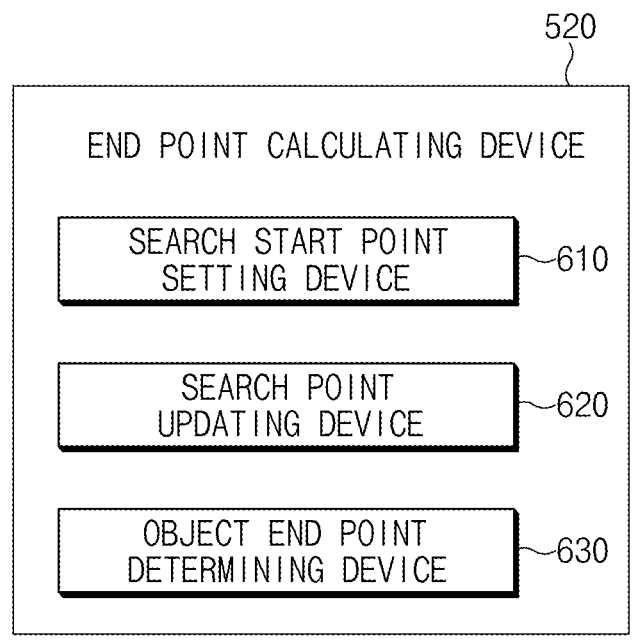
FIG. 6 is a block diagram illustrating a structure of the end point calculating device of FIG. 5.

FIG. 6 is a block diagram illustrating a structure of the end point calculating device of FIG. 5.

Referring to FIG. 6, an end point calculating device 520 may be configured to include a search start point setting device 610, a search point updating device 620, and an object end point determining device 630.

The search start point setting device 610 may set center coordinates determined by a center coordinate determining device 510 of FIG. 5 to a start point for searching for an end point for each direction.

The search point updating device 620 may move a search location for each certain level from the search start point in a blue direction of a heatmap until the object end point for each direction is determined.

The object end point determining device 630 may extract a local value in a movement point for each direction and may compare the extracted local value with a certain threshold to determine an end point for each direction.

As an example, when the direction having a local value less than the threshold is detected, the object end point determining device 630 may determine a corresponding movement point—that is, movement coordinates—as an end point of the detected direction.

Figure 7:
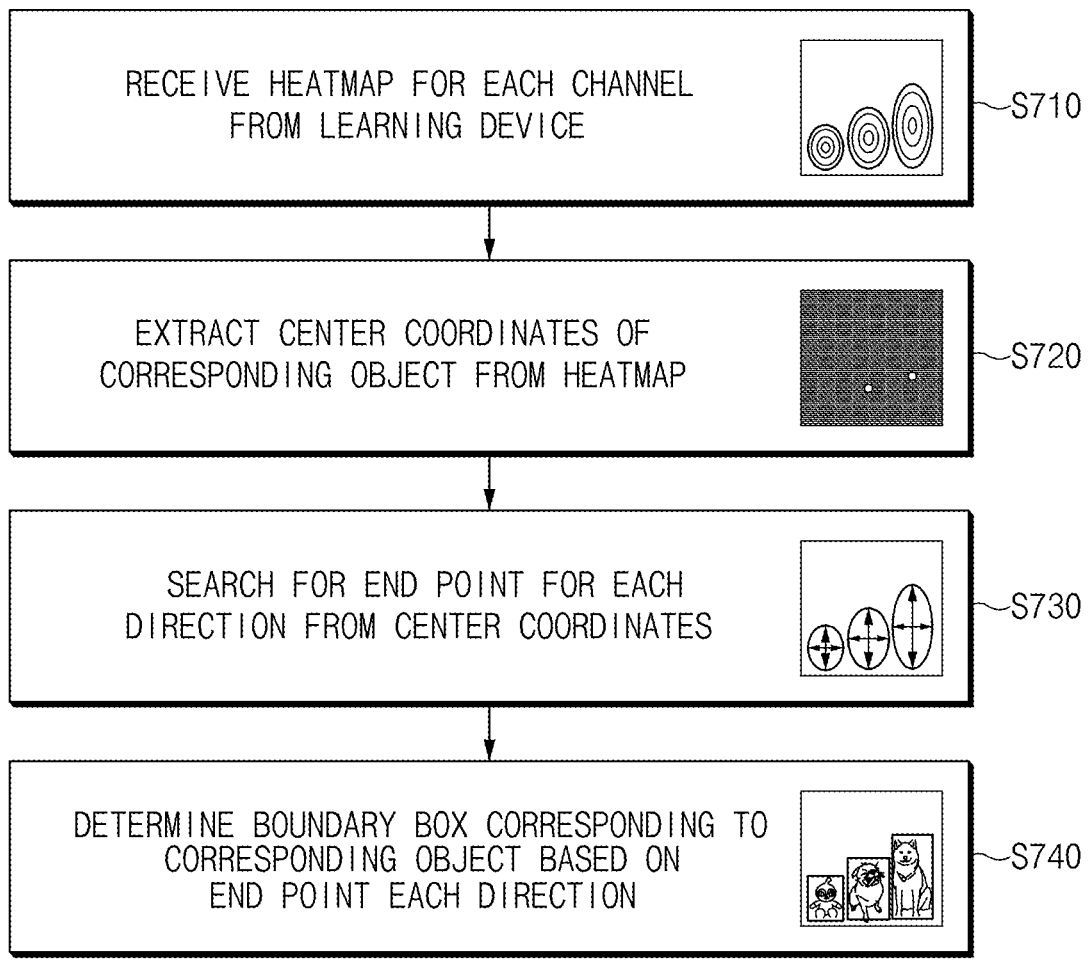
FIG. 7 is a flowchart illustrating a method for detecting an object based on deep learning according to an embodiment of the present disclosure.

FIG. 7 is a flowchart illustrating a method for detecting an object based on deep learning according to an embodiment of the present disclosure.

In detail, FIG. 7 is a flowchart illustrating a procedure of generating a boundary box in a post-processing device 330 of an object detector 300.

Referring to FIG. 7, in S710, the post-processing device 330 may receive a heatmap for each channel from a learning device 320 of FIG. 3.

In S720, the post-processing device 330 may extract center coordinates of a corresponding object from the heatmap. As an example, the post-processing device 330 may determine coordinates having the largest local value of a 2D Gaussian kernel corresponding to the heatmap as the center coordinates.

In S730, the post-processing device 330 may search for an end point for each direction from the center coordinates.

In S740, the post-processing device 330 may determine a boundary box corresponding to the object based on the end point for each direction.

Figure 8:
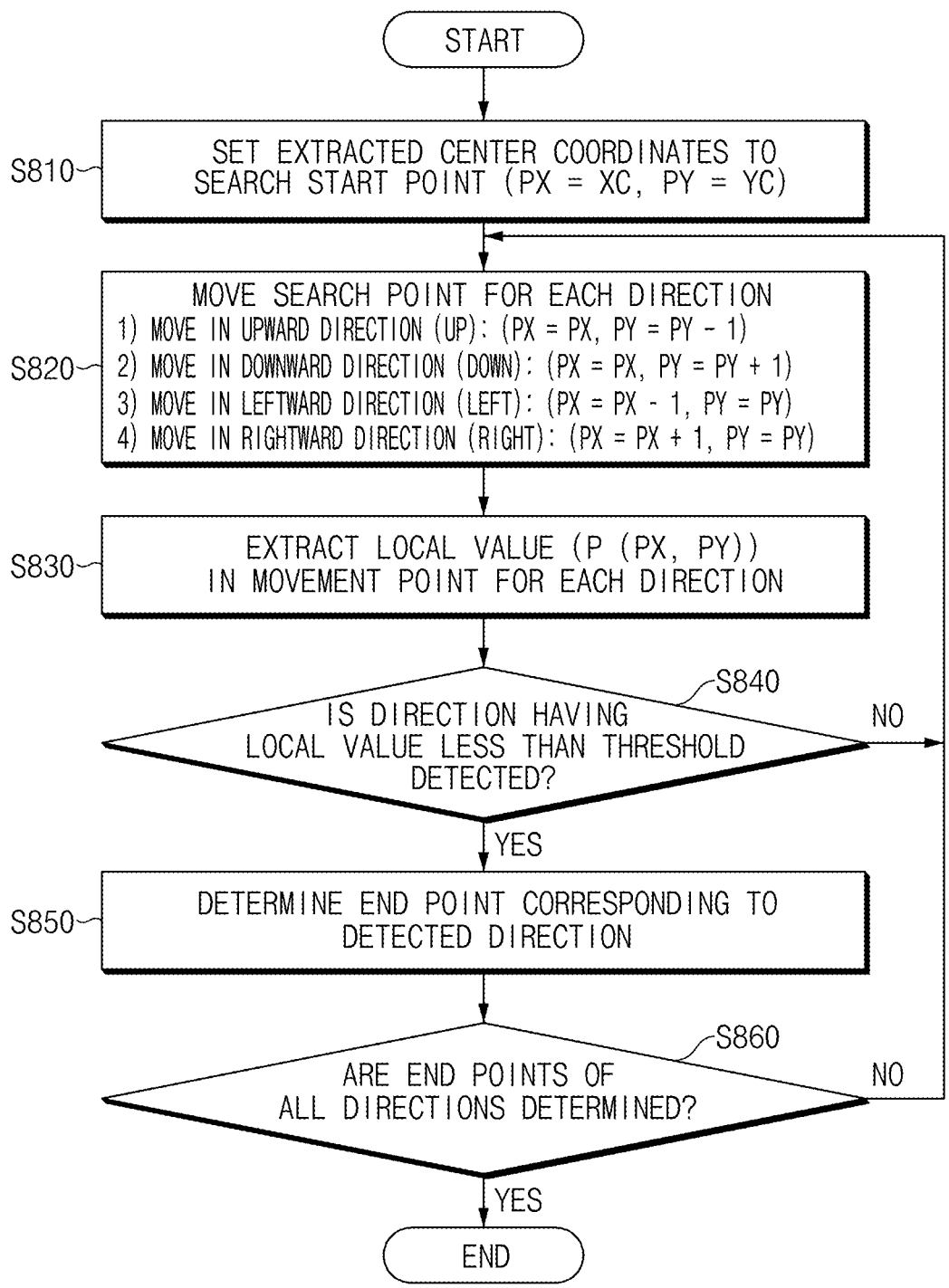
FIG. 8 is a flowchart illustrating a method for detecting an object based on deep learning according to another embodiment of the present disclosure.

FIG. 8 is a flowchart illustrating a method for detecting an object based on deep learning according to another embodiment of the present disclosure.

In detail, FIG. 8 is a flowchart illustrating a method for calculating an end point for each direction in an end point calculating device 520 of a post-processing device 330.

Referring to FIG. 8, in S810, the end point calculating device 520 may set extracted center coordinates (Xc, Yc) to a search start point (px=Xc and py=Yc) for determining an end point for each direction.

In S820, the end point calculating device 520 may move—that is, update—a search point for each direction from the set search start point.

As an example, the end point calculating device 520 may move a search point for the following upward, downward, leftward, or rightward direction for each certain level—for example, on a per-pixel basis —.
1) move in an upward direction (up): (px=px, py=py−1)
2) move in a downward direction (down): (px=px, py=py+1)
3) move in a leftward direction (left): (px=px−1, py=py)
4) move in a rightward direction (right): (px=px+1, py=py)

In S830, the end point calculating device 520 may extract a local value (p(px, py)) in a movement point for each direction.

In S840, the end point calculating device 520 may detect a direction having a local value less than a certain threshold.

When the direction having the local value less than the threshold is detected in S840, in S850, the end point calculating device 520 may determine an end point corresponding to the detected direction. When the direction having the local value equal to or greater than the threshold is detected in S840, in S850, the end point calculating device 520 may enter S820 to continue searching for an end point for the direction which remains.

In S860, the end point calculating device 520 may determine whether end points in all directions are determined.

When the end points in all the directions are determined as a result of the determination, the end point calculating device 520 may end the end point search procedure.

When a direction, an end point of which is not determined, remains as a result of the determination, the end point calculating device 520 may enter S820 to continue searching for an end point for the direction which remains.

Figure 9:
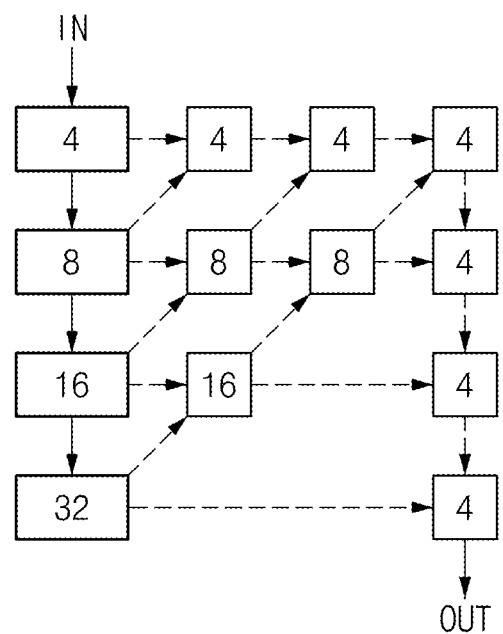
FIG. 9 is a drawing illustrating a structure of a backbone network according to an embodiment of the present disclosure.

FIG. 9 is a drawing illustrating a structure of a backbone network according to an embodiment of the present disclosure.

The backbone network according to an embodiment may be implemented as deep layer aggregation (DLA).

The DLA may be a network for segmentation, which has an advantage of providing a higher processing speed than performance because of producing high performance using relatively few parameters. The DLA according to an embodiment may be a deformation network of DLA used in a conventional CenterNet, which has the following features.

The DLA according to an embodiment may have an advantage of more concentrating on an important portion of an image to perform learning by providing freedom such that a size of a kernel may be dynamically deformed, rather than performing convolution using a square kernel as large as a predetermined size, by applying a deformable convolutional neural network rather than a general convolutional neural network. Furthermore, the DLA to which the deformable convolutional neural network is applied may be suitable to generate a heatmap using a 2D Gaussian kernel.

Particularly, as shown in FIG. 9, because the DLA to which the deformable convolutional neural network according to an embodiment is applied includes more connections than existing DLA, it may have an advantage of better including semantic information of feature maps of several layers.

Referring to FIG. 9, a number in each box refers to the stride, the black arrow refers to deformable convolution, the orange arrow refers to upsampling, the black box refers to the convolutional block, and the green box refers to the aggregation node—that is, sum —.

Figure 10:
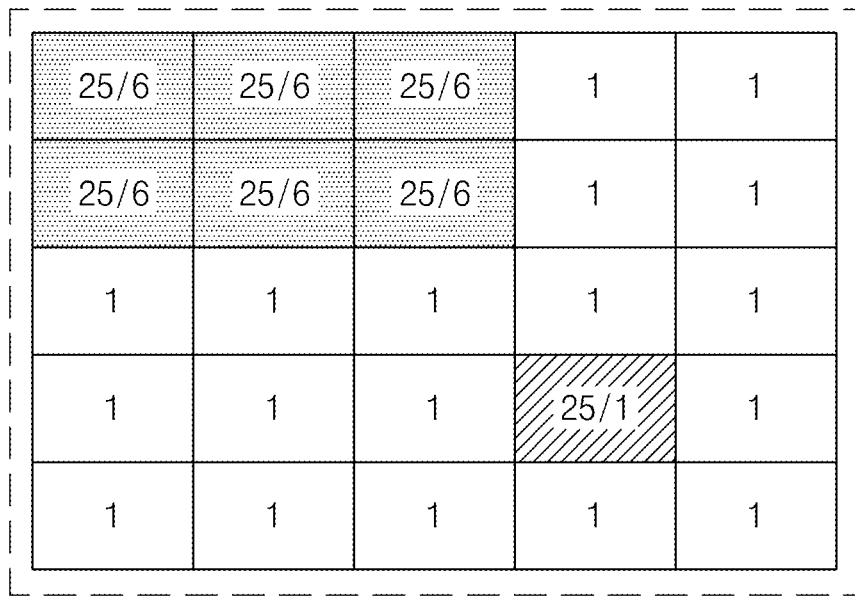
FIG. 10 is a drawing illustrating a loss function according to an embodiment of the present disclosure.

FIG. 10 is a drawing illustrating a loss function according to an embodiment of the present disclosure.

As an embodiment, a mean square error (MSE) scheme may be applied to a loss function used for learning in a backbone network.

An object detector 300 according to an embodiment of the present disclosure may proceed with learning to reduce a Euclidean distance between a ground truth heatmap generated using box coordinates—that is, a ground truth label—of each object in ground truth of a learning dataset and an output heatmap of the backbone network.

In this case, a large object is assigned a higher loss value than a small object due to characteristics of the MSE loss function, and this causes the result of degrading a capability of detecting the small object.

Thus, a size weight mask (SWM) technique capable of compensating for performance degradation according to a size of an object by applying a weight according to the size of the object to a loss value may be applied to the MSE loss function according to an embodiment of the present disclosure. A capability of detecting a small object in the object detector 300 may be improved by applying the SWM technique.

As shown in FIG. 10, it is assumed that there are two objects—that is, a blue portion, the area of which is 6 and a green portion, the area of which is 1—in one heatmap. In this case, each pixel value M(p) of the SWM may be determined as a value obtained by dividing the area of the entire heatmap by the area of the object in an object region and may be determined as "1" in a region where there is no object, using Equation 2 below.

$$M(p)=(\text{area of entire heatmap})/(\text{area of object})<\text{object region}>$$

$$M(p)=1<\text{region where there is no object}> \quad \text{[Equation 2]}$$

Figure 11:
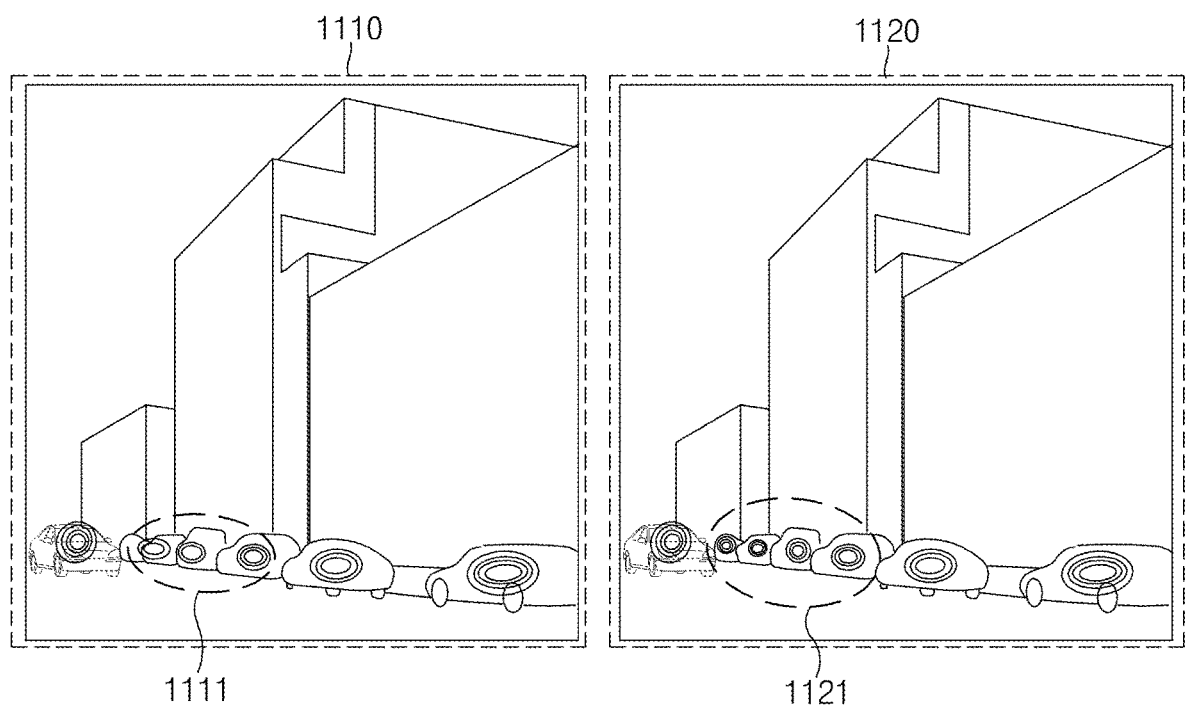
FIG. 11 is a drawing illustrating a process of deriving an improvement item by means of a visualized output of an apparatus for detecting an anchor-free object based on deep learning according to an embodiment of the present disclosure.

FIG. 11 is a drawing illustrating a process of deriving an improvement item by means of a visualized output of an apparatus for detecting an anchor-free object based on deep learning according to an embodiment of the present disclosure.

An apparatus 300 for detecting an anchor-free object based on deep learning according to an embodiment of the present disclosure may visualize and output the result of detecting the object as shown in reference numerals 1110 and 1120.

In general, to apply an object recognizer to real life, there is a need for a task of readjusting a hyperparameter to suit a desired dataset.

A device developer may intuitively identify a portion, the recognition ability of which is insufficient, through the visualized heatmap and may extract an optimal hyperparameter suitable for the desired dataset based on the identified result. Thus, the apparatus 300 for detecting the anchor-free object based on the deep learning according to an embodiment of the present disclosure may provide a user with the visualized heatmap, thus effectively improving the object detection probability.

As an example, the user may identify inaccurate detection capability for a small object through a heatmap shown in a first region 1111 of the left image 1110 of FIG. 11.

When the user identifies that the detection capability for the small object is degraded through the visualized heatmap, parameter turning may be performed by means of an SWM technique. The user may identify a second region 1121 of the right image 1120 output after the parameter tuning, thus intuitively identifying that the object detection capability for the small object is enhanced.

Figure 12:
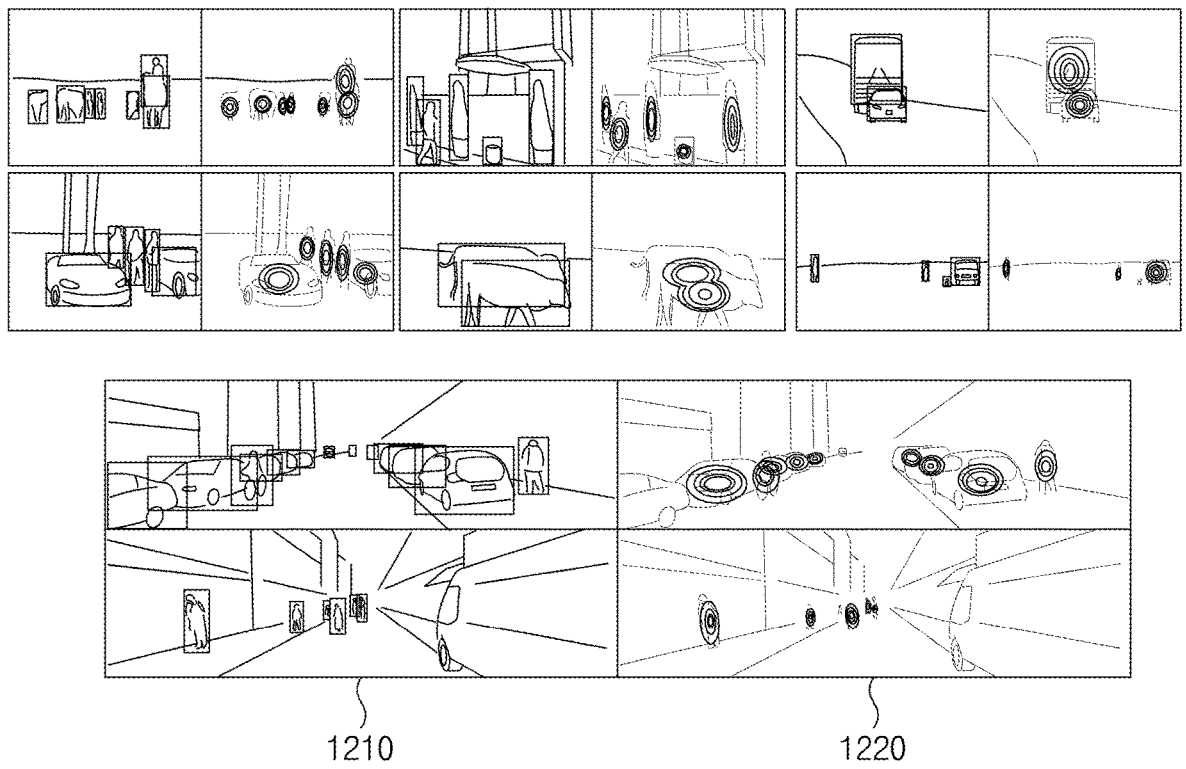
FIG. 12 is a drawing illustrating an output result of an apparatus for detecting an anchor-free object based on deep learning according to an embodiment of the present disclosure.

FIG. 12 is a drawing illustrating an output result of an apparatus for detecting an anchor-free object based on deep learning according to an embodiment of the present disclosure.

Referring to FIG. 12, an apparatus 300 for detecting an anchor-free object based on deep learning may visualize and output a boundary box calculated through post-processing as well as a heatmap object through machine learning.

As an example, reference numeral 1210 is a boundary box image where the calculated boundary box is mapped to an input image, and reference numeral 1220 is a heatmap image where a heatmap is mapped to the input image.

The apparatus 300 for detecting the anchor-free object based on the deep learning according to an embodiment of the present disclosure may provide the boundary box image and the heatmap image at the same time, thus accurately representing an object region as a Gaussian kernel as well as classifying objects well.

Furthermore, the apparatus 300 for detecting the anchor-free object based on the deep learning according to an embodiment of the present disclosure may distinguish an overlapped object well as well as accurately detecting objects between from a large object to a small object.

Figure 13:
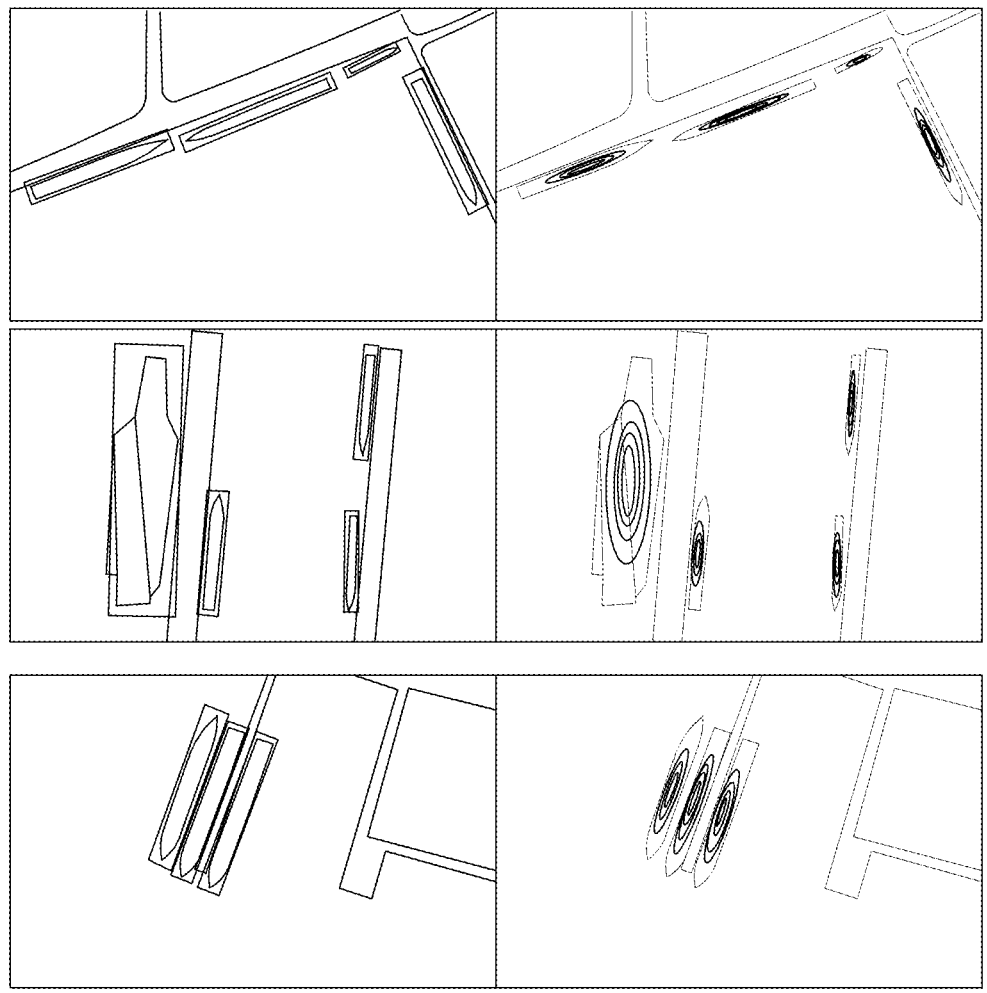
FIG. 13 is a drawing illustrating an output result of an apparatus for detecting an anchor-free object based on deep learning according to another embodiment of the present disclosure.

FIG. 13 is a drawing illustrating an output result of an apparatus for detecting an anchor-free object based on deep learning according to another embodiment of the present disclosure.

An apparatus 300 for detecting an anchor-free object based on deep learning according to another embodiment of the present disclosure may effectively extract and display a region of a rotating object such as a ship, as shown in FIG. 13, without using a separate additional processing and method by applying a technique of representing a 2D Gaussian kernel.

The operations of the method or the algorithm described in connection with the embodiments disclosed herein may be embodied directly in hardware or a software module executed by a processor or in a combination thereof. The software module may reside on a storage medium (i.e., a memory and/or a storage), which may include a non-transitory computer-readable medium, such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components. When the processor executes the software module stored in the storage medium, the processor may be configured to perform the above-described operations or method. In one example, the apparatus 300 may include the processor and/or the storage medium. In another example, the input device 310, the learning device 320 and the components thereof, the post-processing device 330 and the components thereof, and the output device 340, each, or together, may be implemented with a processor which may be configured to perform the corresponding operations when executing the software module stored in the storage medium.

An embodiment of the present disclosure may provide the method and apparatus for detecting the anchor-free object based on the deep learning using a 2D Gaussian kernel.

Furthermore, an embodiment of the present disclosure may provide the method and apparatus for detecting the anchor-free object based on the deep learning, which is capable of quickly and accurately recognizing and interpreting an object on a network of a simple structure.

Furthermore, an embodiment of the present disclosure may provide the method and apparatus for detecting the anchor-free object based on the deep learning, which facilitates parameter tuning by facilitating visualization and intuitive understanding and an operation by using a Gaussian kernel.

Furthermore, an embodiment of the present disclosure may provide the method and apparatus for detecting the anchor-free object based on the deep learning using the 2D Gaussian kernel, which is capable of finding a center point of an object through the 2D Gaussian kernel and quickly and accurately performing object recognition using only a heatmap of one channel and only one loss function.

Furthermore, an embodiment of the present disclosure may provide an autonomous vehicle having the apparatus for detecting the anchor-free object based on the deep learning using the 2D Gaussian kernel.

Furthermore, an embodiment of the present disclosure may more accurately extract a region of an object rotated without using a separate method due to the flexibility of the method of representing the 2D Gaussian kernel.

Furthermore, an embodiment of the present disclosure may improve the capability of detecting a small object by applying a size weight mask (SWM) technique to a loss function.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A method for detecting an anchor-free object based on deep learning, the method comprising:
   receiving a target image for object detection, by an input device;
   inputting the image to a backbond network and performing learning to generate a heatmap, by a learning device;
   post-processing the heatmap, by a post-processing device; and
   outputting the post-processed result on a screen, by an output device
   wherein the generated heatmap is configured with channels as many as the number of objects to be classified, the objects being included in the image,
   wherein the heatmap on which the object is displayed is generated using a two-dimensional (2D) Gaussian kernel for each channel through the learning.

2. The method of claim 1, wherein the backbone network is a deformable convolutional neural network having a variable filter size and shape depending on the image.

3. The method of claim 1, wherein the inputting of the image to the backbond network and the performing of the learning to generate the heatmap includes:
   generating a ground truth heatmap including the 2D Gaussian kernel having the same size as a region of each object based on box coordinates included in a ground truth label; and
   performing learning to reduce a Euclidean distance between the ground truth heatmap and an output heatmap of the backbone network.

4. The method of claim 1, wherein a loss function L used for the learning is a mean squared error, and a size weight mask (SWM) technique of multiplying a weight corresponding to an object size by a loss value to output the loss value irrespective of the object size is applied to the loss function L.

5. The method of claim 4, wherein the loss function L is that $$L = \sum_{p} M(p) \times \left(Y(p) - \hat{Y}(p)\right)^2,$$

where, p denotes each pixel of the heatmap, Y denotes the ground truth heatmap, Ŷ denotes the backbone network output heatmap, and M denotes the SWM, wherein the SWM pixel value M(p) in the loss function L is determined as a value obtained by dividing a size of the entire heatmap by the size of the object for a region where there is the object and is determined as "1" for a region where there is no object.

6. The method of claim 1, wherein the post-processing of the heatmap includes:

determining center coordinates of the object based on a local maximum value of the 2D Gaussian kernel;

calculating an end point for each direction of the object based on the determined center coordinates; and generating a boundary box based on the calculated end point for each direction.

7. The method of claim 6, wherein the local maximum value is determined through max pooling computation.

8. The method of claim 6, wherein the calculating of the end point for each direction of the object based on the determined center coordinates includes:

setting the determined center coordinates to a search start point;

comparing a local value on coordinates moving a certain level in an upward direction, a downward direction, a leftward direction, or a rightward direction from the start point with a threshold; and determining coordinates, corresponding to the local value less than the threshold, for each direction as an end point of the direction.

9. An apparatus for detecting an anchor-free object based on deep learning, the apparatus comprising:

an input device configured to receive a target image for object detection;

a learning device configured to input the image to a backbond network and perform learning to generate a heatmap;

a post-processing device configured to post-process the heatmap; and an output device configured to output the post-processed result on a screen, wherein the generated heatmap is configured with channels as many as the number of objects to be classified, the objects being included in the image, wherein the learning device generates the heatmap on which the object is displayed using a 2D Gaussian kernel for each channel through the learning.

10. The apparatus of claim 9, wherein the backbone network is a deformable convolutional neural network having a variable filter size and shape depending on the image.

11. The apparatus of claim 9, wherein the learning device generates a ground truth heatmap including the 2D Gaussian kernel having the same size as a region of each object based on box coordinates included in a ground truth label and performs learning to reduce a Euclidean distance between the ground truth heatmap and an output heatmap of the backbone network.

12. The apparatus of claim 9, wherein a loss function L used for the learning is a mean squared error, and a size weight mask (SWM) technique of multiplying a weight corresponding to an object size by a loss value to output the loss value irrespective of the object size is applied to the loss function L.

13. The apparatus of claim 12, wherein The loss function L is that $$L = \sum_P M(p) \times \left(Y(p) - \hat{Y}(p)\right)^2,$$

where, p denotes each pixel of the heatmap, Y denotes the ground truth heatmap, Ŷ denotes the backbone network output heatmap, and M denotes the SWM, and wherein the SWM pixel value M(p) in the loss function L is determined as a value obtained by dividing a size of the entire heatmap by the size of the object for a region where there is the object and is determined as "1" for a region where there is no object.

14. The apparatus of claim 9, wherein the preprocessing device determines center coordinates of the object based on a local maximum value of the 2D Gaussian kernel, calculates an end point for each direction of the object based on the determined center coordinates, and generates a boundary box based on the calculated end point for each direction.

15. The apparatus of claim 14, wherein the local maximum value is determined through max pooling computation.

16. The apparatus of claim 14, wherein the post-processing device sets the determined center coordinates to a search start point, compares a local value on coordinates moving a certain level in an upward direction, a downward direction, a leftward direction, or a rightward direction from the start point with a threshold, and identifies coordinates, corresponding to the local value less than the threshold, for each direction to determine the coordinates as an end point of the direction.

17. A method for detecting an anchor-free object based on deep learning, the method comprising:

receiving a target image for object detection, by an input device;

inputting the image to a backbond network and performing learning to generate a heatmap, by a learning device;

post-processing the heatmap, by a post-processing device; and outputting the post-processed result on a screen, by an output device, wherein the backbone network is a deformable convolutional neural network having a variable filter size and shape depending on the image.

* * * * *